(12) United States Patent
Wang et al.

(10) Patent No.: US 7,597,959 B2
(45) Date of Patent: Oct. 6, 2009

(54) CORE-SHELL FLUORESCENT NANOPARTICLES

(75) Inventors: Xiaorong Wang, Hudson, OH (US); Christine Rademacher, Akron, OH (US)

(73) Assignee: Bridgestone Corporation (JP)

( * ) Notice: Subject to any disclaimer, the term of this patent is extended or adjusted under 35 U.S.C. 154(b) by 18 days.

(21) Appl. No.: 11/612,554

(22) Filed: Dec. 19, 2006

(65) Prior Publication Data

US 2008/0145660 A1    Jun. 19, 2008

(51) Int. Cl.
*B32B 5/16* (2006.01)
(52) U.S. Cl. .................... 428/403; 428/407; 570/127; 977/773
(58) Field of Classification Search ................ 428/403, 428/407; 977/773
See application file for complete search history.

(56) References Cited

U.S. PATENT DOCUMENTS

| | | | |
|---|---|---|---|
| 2,531,396 A | 11/1950 | Carter et al. | |
| 3,598,884 A | 8/1971 | Wei et al. | |
| 3,725,505 A | 4/1973 | O'Malley | |
| 3,793,402 A | 2/1974 | Owens | |
| 3,840,620 A | 10/1974 | Gallagher | |
| 3,972,963 A | 8/1976 | Schwab et al. | |
| 4,233,409 A | 11/1980 | Bulkley | |
| 4,247,434 A | 1/1981 | Vanderhoff et al. | |
| 4,326,008 A | 4/1982 | Rembaum | |
| 4,386,125 A | 5/1983 | Shiraki et al. | |
| 4,463,129 A | 7/1984 | Shinada et al. | |
| 4,543,403 A | 9/1985 | Isayama et al. | |
| 4,598,105 A | 7/1986 | Weber et al. | |
| 4,602,052 A | 7/1986 | Weber et al. | |
| 4,659,790 A | 4/1987 | Shimozato et al. | |
| 4,717,655 A | 1/1988 | Fulwyler | |
| 4,725,522 A | 2/1988 | Breton et al. | |
| 4,764,572 A | 8/1988 | Bean, Jr. | |
| 4,773,521 A | 9/1988 | Chen | |
| 4,774,189 A | 9/1988 | Schwartz | |
| 4,788,254 A | 11/1988 | Kawakubo et al. | |

(Continued)

FOREIGN PATENT DOCUMENTS

CA        2127919        3/1995

(Continued)

OTHER PUBLICATIONS

Star Polymers by Immobilizing Functional Block Copolymers, by Koji Ishizu, Tokyo Institute of Technology, Meguro-ku, Tokyo, Japan, Star and Hyperbranched Polymers, 1999, ISBN 0-8247-1986-7.

(Continued)

*Primary Examiner*—H. (Holly) T Le
(74) *Attorney, Agent, or Firm*—Meredith E. Hooker; Nathan Lewis

(57) ABSTRACT

A fluorescent nanoparticle includes a core comprising an alkenylbenzene; an intermediate layer, an outer shell layer, and a fluorescent portion. The fluorescent portion includes a structure represented by the following formula:

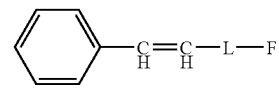

wherein L is a direct bond or a linker group, and F is any fluorescent moiety. The fluorescent portion is located in at least one of the following locations: the core, the intermediate layer, or the shell layer of the nanoparticle. Methods for making the fluorescent nanoparticle are also described.

24 Claims, 3 Drawing Sheets

U.S. PATENT DOCUMENTS

| | | | |
|---|---|---|---|
| 4,829,130 A | 5/1989 | Licchelli et al. | |
| 4,829,135 A | 5/1989 | Gunesin et al. | |
| 4,837,274 A | 6/1989 | Kawakubo et al. | |
| 4,837,401 A | 6/1989 | Hirose et al. | |
| 4,861,131 A | 8/1989 | Bois et al. | |
| 4,870,144 A | 9/1989 | Noda et al. | |
| 4,871,814 A | 10/1989 | Gunesin et al. | |
| 4,904,730 A | 2/1990 | Moore et al. | |
| 4,904,732 A | 2/1990 | Iwahara et al. | |
| 4,906,695 A | 3/1990 | Blizzard et al. | |
| 4,920,160 A | 4/1990 | Chip et al. | |
| 4,942,209 A | 7/1990 | Gunesin | |
| 5,036,138 A | 7/1991 | Stamhuis et al. | |
| 5,066,729 A | 11/1991 | Stayer, Jr. et al. | |
| 5,073,498 A | 12/1991 | Schwartz et al. | |
| 5,075,377 A | 12/1991 | Kawabuchi et al. | |
| 5,120,379 A | 6/1992 | Noda et al. | |
| 5,130,377 A | 7/1992 | Trepka et al. | |
| 5,169,914 A | 12/1992 | Kaszas et al. | |
| 5,194,300 A | 3/1993 | Cheung | |
| 5,219,945 A | 6/1993 | Dicker et al. | |
| 5,227,419 A | 7/1993 | Moczygemba et al. | |
| 5,237,015 A | 8/1993 | Urban | |
| 5,241,008 A | 8/1993 | Hall | |
| 5,247,021 A | 9/1993 | Fujisawa et al. | |
| 5,256,736 A | 10/1993 | Trepka et al. | |
| 5,262,502 A | 11/1993 | Fujisawa et al. | |
| 5,290,873 A | 3/1994 | Noda et al. | |
| 5,290,875 A | 3/1994 | Moczygemba et al. | |
| 5,290,878 A | 3/1994 | Yamamoto et al. | |
| 5,329,005 A | 7/1994 | Lawson et al. | |
| 5,331,035 A | 7/1994 | Hall | |
| 5,336,712 A | 8/1994 | Austgen, Jr. et al. | |
| 5,362,794 A | 11/1994 | Inui et al. | |
| 5,395,891 A | 3/1995 | Obrecht et al. | |
| 5,395,902 A | 3/1995 | Hall | |
| 5,399,628 A | 3/1995 | Moczygemba et al. | |
| 5,399,629 A | 3/1995 | Coolbaugh et al. | |
| 5,405,903 A | 4/1995 | Van Westrenen et al. | |
| 5,421,866 A | 6/1995 | Stark-Kasley et al. | |
| 5,436,298 A | 7/1995 | Moczygemba et al. | |
| 5,438,103 A | 8/1995 | DePorter et al. | |
| 5,447,990 A | 9/1995 | Noda et al. | |
| 5,462,994 A | 10/1995 | Lo et al. | |
| 5,514,734 A | 5/1996 | Maxfield et al. | |
| 5,514,753 A | 5/1996 | Ozawa et al. | |
| 5,521,309 A | 5/1996 | Antkowiak et al. | |
| 5,525,639 A | 6/1996 | Keneko et al. | |
| 5,527,870 A | 6/1996 | Maeda et al. | |
| 5,530,052 A | 6/1996 | Takekoshi et al. | |
| 5,580,925 A | 12/1996 | Iwahara et al. | |
| 5,587,423 A | 12/1996 | Brandstetter et al. | |
| 5,594,072 A | 1/1997 | Handlin, Jr. et al. | |
| 5,614,579 A | 3/1997 | Roggeman et al. | |
| 5,627,252 A | 5/1997 | De La Croi Habimana | |
| 5,686,528 A | 11/1997 | Wills et al. | |
| 5,688,856 A | 11/1997 | Austgen, Jr. et al. | |
| 5,700,897 A * | 12/1997 | Klainer et al. ................. 528/15 |
| 5,707,439 A | 1/1998 | Takekoshi et al. | |
| 5,728,791 A | 3/1998 | Tamai et al. | |
| 5,733,975 A | 3/1998 | Aoyama et al. | |
| 5,739,267 A | 4/1998 | Fujisawa et al. | |
| 5,742,118 A | 4/1998 | Endo et al. | |
| 5,763,551 A | 6/1998 | Wunsch et al. | |
| 5,773,521 A | 6/1998 | Hoxmeier et al. | |
| 5,777,037 A | 7/1998 | Yamanaka et al. | |
| 5,811,501 A | 9/1998 | Chiba et al. | |
| 5,834,563 A | 11/1998 | Kimura et al. | |
| 5,847,054 A | 12/1998 | McKee et al. | |
| 5,849,847 A | 12/1998 | Quirk | |
| 5,855,972 A | 1/1999 | Kaeding | |
| 5,883,173 A | 3/1999 | Elspass et al. | |
| 5,891,947 A | 4/1999 | Hall et al. | |
| 5,897,811 A * | 4/1999 | Lesko ................. 252/301.35 |
| 5,905,116 A | 5/1999 | Wang et al. | |
| 5,910,530 A | 6/1999 | Wang et al. | |
| 5,955,537 A | 9/1999 | Steininger et al. | |
| 5,986,010 A | 11/1999 | Clites et al. | |
| 5,994,468 A | 11/1999 | Wang et al. | |
| 6,011,116 A | 1/2000 | Aoyama et al. | |
| 6,020,446 A | 2/2000 | Okamoto et al. | |
| 6,025,416 A | 2/2000 | Proebster et al. | |
| 6,025,445 A | 2/2000 | Chiba et al. | |
| 6,060,549 A | 5/2000 | Li et al. | |
| 6,060,559 A | 5/2000 | Feng et al. | |
| 6,087,016 A | 7/2000 | Feeney et al. | |
| 6,087,456 A | 7/2000 | Sakaguchi et al. | |
| 6,106,953 A | 8/2000 | Zimmermann et al. | |
| 6,117,932 A | 9/2000 | Hasegawa et al. | |
| 6,121,379 A | 9/2000 | Yamanaka et al. | |
| 6,127,488 A | 10/2000 | Obrecht et al. | |
| 6,147,151 A | 11/2000 | Fukumoto et al. | |
| 6,180,693 B1 | 1/2001 | Tang et al. | |
| 6,191,217 B1 | 2/2001 | Wang et al. | |
| 6,197,849 B1 | 3/2001 | Zilg et al. | |
| 6,204,354 B1 | 3/2001 | Wang et al. | |
| 6,225,394 B1 | 5/2001 | Lan et al. | |
| 6,252,014 B1 | 6/2001 | Knauss | |
| 6,255,372 B1 | 7/2001 | Lin et al. | |
| 6,268,451 B1 | 7/2001 | Faust et al. | |
| 6,277,304 B1 | 8/2001 | Wei et al. | |
| 6,348,546 B2 | 2/2002 | Hiiro et al. | |
| 6,359,075 B1 | 3/2002 | Wollum et al. | |
| 6,379,791 B1 | 4/2002 | Cernohous et al. | |
| 6,383,500 B1 | 5/2002 | Wooley et al. | |
| 6,395,829 B1 | 5/2002 | Miyamoto et al. | |
| 6,420,486 B1 | 7/2002 | DePorter et al. | |
| 6,437,050 B1 | 8/2002 | Krom et al. | |
| 6,441,090 B1 | 8/2002 | Demirors et al. | |
| 6,448,353 B1 | 9/2002 | Nelson et al. | |
| 6,489,378 B1 | 12/2002 | Sosa et al. | |
| 6,506,567 B2 * | 1/2003 | Makino et al. ................. 435/6 |
| 6,524,595 B1 | 2/2003 | Perrier et al. | |
| 6,573,313 B2 | 6/2003 | Li et al. | |
| 6,573,330 B1 | 6/2003 | Fujikake et al. | |
| 6,598,645 B1 | 7/2003 | Larson | |
| 6,649,702 B1 | 11/2003 | Rapoport et al. | |
| 6,663,960 B1 * | 12/2003 | Murakami et al. .......... 428/402 |
| 6,689,469 B2 | 2/2004 | Wang et al. | |
| 6,693,746 B1 | 2/2004 | Nakamura et al. | |
| 6,706,813 B2 | 3/2004 | Chiba et al. | |
| 6,706,823 B2 | 3/2004 | Wang et al. | |
| 6,727,311 B2 | 4/2004 | Ajbani et al. | |
| 6,737,486 B2 | 5/2004 | Wang | |
| 6,750,297 B2 | 6/2004 | Yeu et al. | |
| 6,759,464 B2 | 7/2004 | Ajbani et al. | |
| 6,774,185 B2 | 8/2004 | Lin et al. | |
| 6,777,500 B2 | 8/2004 | Lean et al. | |
| 6,780,937 B2 | 8/2004 | Castner | |
| 6,835,781 B2 | 12/2004 | Kondou et al. | |
| 6,858,665 B2 | 2/2005 | Larson | |
| 6,861,462 B2 | 3/2005 | Parker et al. | |
| 6,872,785 B2 | 3/2005 | Wang et al. | |
| 6,875,818 B2 | 4/2005 | Wang | |
| 6,908,958 B2 | 6/2005 | Maruyama et al. | |
| 6,956,084 B2 | 10/2005 | Wang et al. | |
| 7,056,840 B2 | 6/2006 | Miller et al. | |
| 7,071,246 B2 | 7/2006 | Xie et al. | |
| 7,112,369 B2 | 9/2006 | Wang et al. | |
| 7,179,864 B2 | 2/2007 | Wang | |
| 7,193,004 B2 | 3/2007 | Weydert et al. | |
| 7,205,370 B2 * | 4/2007 | Wang et al. ................. 526/335 |
| 7,217,775 B2 | 5/2007 | Castner | |
| 7,238,751 B2 | 7/2007 | Wang et al. | |

| | | |
|---|---|---|
| 7,244,783 B2 | 7/2007 | Lean et al. |
| 7,291,394 B2 * | 11/2007 | Winkler et al. ............ 428/403 |
| 7,347,237 B2 | 3/2008 | Xie et al. |
| 7,408,005 B2 | 8/2008 | Zheng et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heimrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0127603 A1 | 7/2004 | Lean et al. |
| 2004/0143064 A1 | 7/2004 | Wang |
| 2004/0198917 A1 | 10/2004 | Castner |
| 2005/0101743 A1 | 5/2005 | Stacy et al. |
| 2005/0182158 A1 | 8/2005 | Ziser et al. |
| 2005/0192408 A1 | 9/2005 | Lin et al. |
| 2005/0197462 A1 | 9/2005 | Wang et al. |
| 2005/0203248 A1 | 9/2005 | Zheng et al. |
| 2005/0215693 A1 | 9/2005 | Wang et al. |
| 2005/0228074 A1 | 10/2005 | Wang et al. |
| 2005/0282956 A1 | 12/2005 | Bohm et al. |
| 2006/0084722 A1 | 4/2006 | Lin et al. |
| 2006/0173115 A1 | 8/2006 | Wang et al. |
| 2006/0173130 A1 | 8/2006 | Wang et al. |
| 2006/0235128 A1 | 10/2006 | Bohm et al. |
| 2007/0135579 A1 | 6/2007 | Obrecht et al. |
| 2007/0142550 A1 | 6/2007 | Wang et al. |
| 2007/0142559 A1 | 6/2007 | Wang et al. |
| 2007/0149649 A1 | 6/2007 | Wang et al. |
| 2007/0161754 A1 | 7/2007 | Bohm et al. |
| 2007/0185273 A1 | 8/2007 | Hall et al. |
| 2007/0196653 A1 | 8/2007 | Hall et al. |
| 2008/0145660 A1 | 6/2008 | Wang et al. |
| 2008/0149238 A1 | 6/2008 | Kleckner et al. |
| 2008/0160305 A1 | 7/2008 | Wang et al. |
| 2008/0286374 A1 | 11/2008 | Wang et al. |
| 2008/0305336 A1 | 12/2008 | Wang et al. |
| 2009/0005491 A1 | 1/2009 | Warren et al. |
| 2009/0048390 A1 | 2/2009 | Wang et al. |
| 2009/0054554 A1 | 2/2009 | Wang et al. |

FOREIGN PATENT DOCUMENTS

| | | |
|---|---|---|
| DE | 3434983 | 4/1986 |
| DE | 4241538 | 6/1994 |
| EP | 0143500 | 6/1985 |
| EP | 0255170 | 2/1988 |
| EP | 0265142 | 4/1988 |
| EP | 0322905 | 7/1989 |
| EP | 0352042 | 1/1990 |
| EP | 0472344 | 2/1992 |
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1134251 | 9/2001 |
| EP | 1273616 | 6/2002 |
| EP | 1321489 | 6/2003 |
| EP | 1783168 | 5/2007 |
| JP | 01279943 | 1/1989 |
| JP | 2191619 | 7/1990 |
| JP | 2196893 | 8/1990 |
| JP | 05132605 | 5/1993 |
| JP | 7011043 | 1/1995 |
| JP | 08199062 | 8/1996 |
| JP | 2000-514791 | 11/2000 |
| JP | 2003-095640 | 4/2003 |
| JP | 2006-072283 | 3/2006 |
| JP | 2006-106596 | 4/2006 |
| JP | 2007-304409 | 11/2007 |
| WO | 91/04992 | 4/1991 |
| WO | 97/04029 | 2/1997 |
| WO | 9853000 | 11/1998 |
| WO | 0075226 | 12/2000 |
| WO | 01/87999 | 11/2001 |
| WO | 02/31002 | 4/2002 |
| WO | 02/081233 | 10/2002 |
| WO | 02/100936 | 12/2002 |
| WO | 03/032061 | 4/2003 |
| WO | 03085040 | 10/2003 |
| WO | 2004/058874 | 7/2004 |
| WO | 2006/069793 | 7/2006 |
| WO | 2008/079276 | 7/2008 |
| WO | 2008/079807 | 7/2008 |
| WO | 2009/006434 | 1/2009 |

OTHER PUBLICATIONS

Formation of Worm-like Micelles from a Polystyrene-Polybutadiene-Polystyrene Block Copolymer in Ethyl Acetate, Canham et al., J.C.S. Faraday I, 1980, 76, 1857-1867.

Anomalous Behaviour of Solutions of Styrene-Butadiene Block Copolymers in Some Solvents, Tuzar et al., Makromol. Chem. 178, 22743-2746, 1977.

Association of Block Copolymers in Selective Solvents, 1 Measurements on Hydrogenated Poly(styrene-isoprene) in Decane and in trans-Decalin, Mandema et al., Makromol. Chem. 180, 1521-1538, 1979.

Light-Scattering Studies of a Polystyrene-Poly(methyl methacrylate) Two-Blcok Copolymer in Mixed Solvents, Utiyama et al. Macromolecules vol. 7, No. 4, Jul.-Aug. 1974.

Greenwod, N.N.; Earnshaw, A., Chemistry of the Elements, pp. 1126-1127, Pergaroen Press, New York 1984.

Kink-Block and Gauche-Block Structures of Bimolecular Films, Gehard Lagaly, Chem. Int. Ed. Engl. vol. 15 (1976) No. 10, pp. 575-586.

Linear Viscoelasticity of Disordered Polystyrene-Polyisoprene . . . Layered-Silicate Nanocomposites, J. Ren, Dept. of Chem Eng. Univ. of Houston, Macromol. 2000, pp. 3739-3746.

Rheology of End-Tethered Polymer Layered Silicate Nanocomposites, R. Krishnamoorti et al., Macromol. 1997, 30, 4097-4102.

Rheology of Nanocomposites Based on Layered Silicates and Polyamide-12, B. Hoffman et al., Colloid Polm. Sci. 278:629-636 (2000).

Quaternary Ammonium Compounds, Encyclopedia of Chem Tech., 4th Ed. vol. 20, 1996, Wiley & Sons, pp. 739-767.

Dendritic Macromolecules: Synthesis of Starburst Dendrimers, Donald A. Tomalia et al., Macromolecules vol. 19, No. 9, 1986, contribution from Functional Polymers/Processes and the Analytical Laboratory, Dow Chemical, Midland, MI 48640, pp. 2466-2468.

Preparation and Characterization of Heterophase Blends of Polycaprolactam and Hydrogenated Polydienes, David F. Lawson et al., pp. 2331-2351, Central Research Labs., The Firestone Tire and Rubber Col, Akron, OH 44317, Journal of Applied Polymer Science, vol. 39, 1990 John Wiliey & Sons, Inc.

R.P. Quirk and S.C. Galvan, Macromolecules, 34, 1192-1197 (2001).

M. Moller, J.P. Spaz, A. Roescher, S. Mobmer, S.T. Selvan, H.A. Klok, Macromol. Symp. 117, 207-218 (1997).

T. Cosgrove, J.S. Phipps, R.M. Richardson, Macromolecules, 26, 4363-4367 (1993).

S. Mossmer, J.P. Spatz, M.Moller, T. Aberle, J. Schmidt, W. Burchard, Macromol. 33, 4791-4798 (2000).

Ultrahydrophobic and Ultrayophobic Surfaces: Some Comments and Examples, Wei Chen et al., The ACS Journal of Surfaces and Colloids, May 11, 1999, vol. 15, No. 10, pp. 3395-3399, Polymer Science and Engineering Dept., Univ. of MA, Amherst, MA 01003.

Super-Repellent Composite Fluoropolymer Surfaces, S.R. Coulson, I. Woodward, J.P.S. Badyal, The Journal of Physical Chemistry B, vol. 104, No. 37, Sep. 21, 2000, pp. 8836-8840, Dept. of Chemistry, Science Laboratories, Durham University, Durham, DH1 3LE, England, U.K.

Transformation of a Simple Plastic into a Superhydrophobic Surface, H. Yildirim Erbil et al., Science vol. 299, Feb. 28, 2003, pp. 1377-1380.

Reaction of Primary Aliphatic Amines with Maleic Anhydride, Lester E. Coleman et al., J. Org. Chem., 24, 185, 1959, pp. 135-136.

Synthesis, Thermal Properties and Gas Permeability of Poly (N-n-alkylmaleimide)s, A. Matsumoto et al., Polymer Journal vol. 23, No. 3, 1991, pp. 201-209.

Simultaneous TA and MS Analysis of Alternating Styrene-Malei Anhydride and Styrene-Maleimide Copolymers, Thermochim. Acta, 277, 14, 1996.

Synthesis and Photocrosslinking of Maleimide-Type Polymers, Woo-Sik Kim et al., Macromol. Rapid Commun., 17, 835, 1996, pp. 835-841.

Polysulfobetaines and Corresponding Cationic Polymers. IV. Synthesis and Aqueous Solution Properties of Cationic Poly (MIQSDMAPM), Wen-Fu Lee et al., J. Appl. Pol. Sci. vol. 59, 1996, pp. 599-608.

Chemical Modification of Poly (styrene-co-maleic anhydride) with Primary N-Alkylamines by Reactive Extrusion, I Vermeesch et al., J. Applied Polym. Sci., vol. 53, 1994, pp. 1365-1373.

Vulcanization Agents and Auxiliary Materials, Kirk-Othmer, Encyclopedia of Chemical Technology, 3rd Ed., Wiley Interscience, NY, 1982, vol. 22, pp. 390-402.

Dialkylimidazolium Chloroaluminate Melts: A New Class of Room-Temperature Ionic Liquids of Electrochemistry, Spectroscopy, and Synthesis. J.S. Wilkes, J.A. Levisky, B.A. Wilson, Inorg. Chem. 1982, 21, pp. 1263-1264.

Polymer-m-Ionic-Liquid Electrolytes C. Tiyapiboonchaiya, D.R. MacFarlane, J. Sun, M. Forsyth, Micromol. Chem. Phys., 2002, 203, pp. 1906-1911.

EXAFS Investigations of the Mechanism of Facilitated Ion Transfer into a Room-Temperature Ionic Liquid. M. Jensen, J.A. Dzielawa, P. Rickert, M.L. Dietz, Jacs, 2002, 124, pp. 10664-10665.

Structure of molten 1,3-dimethylimidazolium chloride using neutron diffraction.C. Hardacre, J.D. Holbrey, S.E.J. McMath, D.T. Bowron, A.K. Soper, J. Chem. Physics, 2003, 118(1), pp. 273-278.

Reverse Atom Transfer Radical Polymerization of Methyl Methacrylate in Room-Temperature Inoic Liqquids, H. Ma, X. Chen, Q-F. Zhou, J. Polym. Sci., A. Polym. Chem. 2003, 41, pp. 143-151.

Non-Derby Relaxations in Disordered Ionic Solids, W. Dieterich, P. Maass, Chem. Chys. 2002, 284, pp. 439-467.

Polymer Layered Silicate Nanocomposites, Giannelis E.P. Advanced Materials vol. 8, No. 1, Jan. 1, 1996, pp. 29-35.

A Review of Nanocomposites 2000, J.N. Hay, S. J. Shaw.

"Dendrimers and Dendrons, Concept, Synthesis, Application", edited by Newkome G.R, Wiley-VCH, 2001, pp. 45, 191-310.

"Synthesis, Functionalization and Surface Treatment of Nanoparticles", edited by Baraton M-I, ASP (Am. Sci. Pub.), Stevenson Ranch, California, 2003, pp. 51-52, 174-208.

Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Bahadur, Pratap, "Block copolymers- Their microdomain formation (in solid state) and surfactant behavior (in solution)", Current Science, vol. 80, No. 8, pp. 1002-1007, Apr. 25, 2001.

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bohm, Georg et al., "Emerging materials: technology for new tires and other rubber products", Tire Technology International, 2006 (4 pp.).

Bradley, John S., "The Chemistry of Transition Metal Colloids", Clusters and Colloids: From Theory to Applications, Chapter 6, Weinheim, VCH, pp. 459-544 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Calderara, Frederic et al., "Synthesis of chromophore-labelled polystyrene/poly(ethylene oxide) diblock copolymers", Makromol. Chem., 194, pp. 1411-1420 (1993).

Chen, Ming-Qing et al., "Graft Copolymers Having Hydrophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).

Edmonds, William F. et al., "Disk Micelles from Nonionic Coil- Coil Diblock Copolymers", Macromolecules, vol. 39, pp. 4526-4530 (May 28, 2006).

Ege, Seyhan, Organic Chemistry Structure and Reactivity, 3rd Edition, p. 959, 1994.

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erhardt, Rainer et al., Macromolecules, vol. 34, No. 4, pp. 1069-1075 (2001).

Eschway, Helmut et al., "Preparation and Some Properties of Star-Shaped Polymers with more than Hundred Side Chains", Die Makromolekulare Chemie 173, pp. 235-239 (1973).

Eschway, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Guo, Andrew et al., "Star Polymers and Nanospheres from Cross-Linkable Diblock Copolymers", Macromolecules, vol. 29, pp. 2487-2493, Jan. 17, 1996.

Hamley, Ian W., "The Physics of Block Copolymers", Oxford Science Publication: Oxford, Chapters 3 and 4, pp. 131-265, (1998).

Ishizu, Koji et al., "Synthesis of Star Polymer with Nucleus of Microgel", Polymer Journal, vol. 12, No. 6, pp. 399-404 (1980).

Ishizu, Koji et al., "Core-Shell Type Polymer Microspheres Prepared from Block Copolymers", Journal of Polymer Science: Part C: Polymer Letters, vol. 26, pp. 281-286, 1988.

Ishizu, Koji, "Synthesis and Structural Ordering of Core-Shell Polymer Microspheres", Prog. Polym. Sci., vol. 23, pp. 1383-1408, 1998.

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mayer, A.B.R. et al., "Transition metal nanoparticles protected by amphiphilic block copolymers as tailored catalyst systems", Colloid Polym. Sci., 275, pp. 333-340 (1997).

Mi, Yongli et al., "Glass transition of nano-sized single chain globules", Polymer 43, Elsevier Science Ltd., pp. 6701-6705 (2002).

Nace, Vaughn M., "Nonionic Surfactants: Polyoxyalkylene Block Copolymers", Surfactant Science Series, vol. 60, pp. 1-266 (1996).

O'Reilly, Rachel K. et al., "Cross-linked block copolymer micelles: functional nanostructures of great potential and versatility", Chem. Soc. Rev., vol. 35, pp. 1068-1083, Oct. 2, 2006.

Okay, Oguz et al., "Steric stabilization of reactive microgels from 1,4-divinylbenzene", Makormol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Oranli, Levent et al., "Hydrodynamic studies on micellar solution of styrene-butadiene block copolymers in selective solvents", Can. J. Chem., vol. 63, pp. 2691-2696, 1985.

Piirma, Irja, "Polymeric Surfactants", Surfactant Science Series, vol. 42, pp. 1-289 (1992).

Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.

Price, Colin, "Colloidal Properties of Block Copolymers", Applied Science Publishers Ltd., Chapter 2, pp. 39-80 (1982).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Riess, Gerard et al., "Block Copolymers", Encyclopedia of Polymer Science and Engineering, vol. 2, pp. 324-434 (1985).

Riess, Gerard, "Micellization of block copolymers", Prog. Polym. Sci., vol. 28, pp. 1107-1170, Jan. 16, 2003.

Saito, Reiko et al., "Synthesis of microspheres with 'hairy-ball' structures from poly (styrene-b-2-vinyl pyridine) diblock copolymers", Polymer, vol. 33, No. 5, pp. 1073-1077, 1992.

Saito, Reiko et al., "Synthesis of Microspheres with Microphase-Separated Shells", Journal of Polymer Science: Part A: Polymer Chemistry, vol. 38, pp. 2091-2097 (2000).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Stepanek, Moroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), Vol. 38, No. 1, pp. 62-63 (1997).

Thurmond, K. Bruce et al., "Shell cross-linked polymer micelles: stabilized assemblies with great versatility and potential", Colloids and Surfaces B: Biointerfaces, vol. 16, pp. 45-54, 1999.

Tsitsilianis, Constantinos et al., Makromol. Chem. 191, pp. 2319-2328 (1990).

Tuzar, Zdenek et al., "Micelles of Block and Graft Copolymers in Solutions", Surface and Colloid Science, vol. 15, Chapter 1, pp. 1-83 (1993).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Strain-induced nonlinearity of filled rubbers", Physical Review E 72, 031406, pp. 1-9 (Sep. 20, 2005).

Pre-print article, Wang, Xiaorong et al., "PMSE 392- Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).

Wang, Xr. et al., "Fluctuations and critical phenomena of a filled elastomer under deformation", Europhysics Letters, vol. 75, No. 4, pp. 590-596 (Aug. 15, 2006).

Webber, Stephen E. et al., "Solvents and Self-Organization of Polymers", NATO ASI Series, Series E: Applied Sciences, vol. 327, pp. 1-509 (1996).

Wilson, D.J. et al., "Photochemical Stabilization of Block Copolymers Micelles", Eur. Polym. J., vol. 24, No. 7, pp. 617-621, 1988.

Wooley, Karen L, "From Dendrimers to Knedel-like Structures", Chem. Eur. J., 3, No. 9, pp. 1397-1399 (1997).

Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

Oct. 20, 2005 Office Action from U.S. Appl. No. 11/104,759, filed Apr. 13, 2005 (12 pp.).

Aug. 21, 2006 Final Office Action from U.S. Appl. No. 11/104,759, filed Apr. 13, 2005 (14 pp.).

Dec. 22, 2006 Advisory Action from U.S. Appl. No. 11/104,759, filed Apr. 13, 2005 (3 pp.).

May 16, 2007 Office Action from U.S. Appl. No. 11/104,759, filed Apr. 13, 2005 (9 pp.).

Oct. 30, 2007 Final Office Action from U.S. Appl. No. 11/104,759, filed Apr. 13, 2005 (11 pp.).

Bridgestone Americas 2006 Presentation (14 pp.).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al., "Preparation of core-shell type polymer microspheres from anionic block copolymers", Polymer, vol. 34, No. 18, pp. 3929-3933 (1993).

O'Reilly, Rachel K. et al., "Functionalization of Micelles and Shell Cross-linked Nanoparticles Using Click Chemistry", Chem. Mater., vol. 17, No. 24, pp. 5976-5988 [Nov. 24, 2005].

Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).

Saito, Reiko et al., "Arm-number effect of core-shell type polymer microsphere: 1. Control of arm-number of microsphere", Polymer, vol. 35, No. 4, pp. 866-871 (1994).

Kralik, M. et al., "Catalysis by metal nanoparticles supported on functional organic polymers", Journal of Molecular Catalysis A: Chemical, vol. 177, pp. 113-138 [2001].

Wang, Xiaorong et al., U.S. Appl. No. 10/791,049, filed Mar. 2, 2004 entitled "Method Of Making Nano-Particles Of Selected Size Distribution".

Wang, Xiaorong et al., U.S. Appl. No. 10/791,177, filed Mar. 2, 2004 entitled "Rubber Composition Containing Functionalized Polymer Nanoparticles".

Wang, Xiaorong et al., U.S. Appl. No. 10/872,731, filed Jun. 21, 2004 entitled "Reversible Polymer/Metal Nano-Composites And Method For Manufacturing Same".

Wang, Xiaorong et al., U.S. Appl. No. 10/886,283, filed Jul. 6, 2004 entitled "Hydropobic Surfaces with Nanoparticles".
Wang, Xiaorong et al., U.S. Appl. No. 11/058,156, filed Feb. 15, 2005 entitled "Multi-Layer Nano-Particle Preparation And Applications".
Wang, Xiaorong et al., U.S. Appl. No. 11/104,759, filed Apr. 13, 2004 entitled "Nano-Particle Preparation And Applications".
Bohm, Georg G.A. et al., U.S. Appl. No. 11/117,981, filed Apr. 29, 2005 entitled "Self Assembly Of Molecules To Form Nano-Particle".
Wang, Xiaorong et al., U.S. Appl. No. 11/305,279, filed Dec. 16, 2005 entitled "Combined Use Of Liquid Polymer And Polymeric Nanoparticles For Rubber Applications".
Wang, Xiaorong et al., U.S. Appl. No. 11/344,861, filed Feb. 1, 2006 entitled "Nano-Composite And Compositions Therefrom".
Wang, Xiaorong et al., U.S. Appl. No. 11/642,796, filed Dec. 20, 2006 entitled "Hollow Nano-Particles And Method Thereof".
Wang, Xiaorong et al., U.S. Appl. No. 11/764,607, filed Jun. 18, 2007 entitled "Multi-Layer Nano-Particle Preparation and Applications".
Warren, Sandra, U.S. Appl. No. 11/771,659, filed Jun. 29, 2007 entitled "One-Pot Synthesis Of Nanoparticles And Liquid Polymer For Rubber Applications".
Wang, Xiaorong et al., U.S. Appl. No. 11/941,128, filed Nov. 16, 2007 entitled "Nano-Particle Preparation And Applications".
Wang, Xiaorong et al., U.S. Appl. No. 11/954,268, filed Dec. 12, 2007 entitled "Nanoporous Polymeric Material And Preparation Method".
Wang, Xiaorong et al., U.S. Appl. No. 12/047,896, filed Mar. 13, 2008 entitled "Reversible Polymer/Metal Nano-Composites And Method For Manufacturing Same".
Wang, Xiaorong et al., U.S. Appl. No. 12/184,895, filed Aug. 1, 2008 entitled "Disk-Like Nanoparticles".
Harlan, Robert D., Final Office Action dated Dec. 10, 2008 from U.S. Appl. No. 10/791,177 (8 pp.).
Cain, Edward J., Final Office Action dated Dec. 9, 2008 from U.S. Appl. No. 11/642,795 (6 pp.).
Mulcahy, Peter D., Restriction/Election Office Action dated Dec. 11, 2008 from U.S. Appl. No. 11/642,802 (7 pp.).
Lipman, Bernard, Notice of Allowance dated Jan. 27, 2009 from U.S. Appl. No. 11/764,607 (4 pp.).
Johnson, Edward M., International Search Report dated Dec. 12, 2008 from PCT Application No. PCT/US07/74611 (5 pp.).
Wang, Xiaorong et al., U.S. Appl. No. 12/374,883 international filing date Jul. 27, 2007, entitled "Polymeric Core-Shell Nanoparticles with Interphase Region".
Mullis, Jeffrey C., Mar. 11, 2009 Office Action from U.S. Appl. No. 10/791,049 (9 pp.).
Harlan, Robert D., Mar. 11, 2009 Notice of Allowance from U.S. Appl. No. 10/791,177 (8 pp.).
Sykes, Altrev C., Mar. 20, 2009 Office Action from U.S. Appl. No. 11/818,023 (27 pp.).
Pak, Hannah J., Apr. 2, 2009 Office Action from U.S. Appl. No. 11/941,128 (9 pp.).
Cui, Honggang et al., "Block Copolymer Assembly via Kinetic Control", Science, vol. 317, pp. 647-650 (Aug. 3, 2007).
Wang, Xiaorong et al., "Under microscopes the poly(styrene/butadiene) nanoparticles", Journal of Electron Microscopy, vol. 56, No. 6, pp. 209-216 (2007).
Wang, Xiaorong et al., "Heterogeneity of structural relaxation in a particle-suspension system", EPL, 79, 18001, pp. 1-5 (Jul. 2007).
Borukhov, Itamar et al., "Enthalpic Stabilization of Brush-Coated Particles in a Polymer Melt", Macromolecules, vol. 35, pp. 5171-5182 (2002).
Braun, Hartmut et al., "Enthalpic interaction of diblock copolymers with immiscible polymer blend components", Polymer Bulletin, vol. 32, pp. 241-248 (1994).
Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).
Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).
Ferreira, Paula G. et al., "Scaling Law for Entropic Effects at Interfaces between Grafted Layers and Polymer Melts", Macromolecules, vol. 31, pp. 3994-4003 (1998).
Gay, C., "Wetting of a Polymer Brush by a Chemically Identical Polymer Melt", Macromolecules, vol. 30, pp. 5939-5943 (1997).
Halperin, A., "Polymeric Micelles: A Star Model", Macromolecules, vol. 20, pp. 2943-2946 (1987).
Hasegawa, Ryuichi et al., "Optimum Graft Density for Dispersing Particles in Polymer Melts", Macromolecules, vol. 29, pp. 6656-6662 (1996).
Kraus, Gerard, "Mechanical Losses in Carbon-Black-Filled Rubbers", Journal of Applied Polymer Science: Applied Polymer Symposium, vol. 39, pp. 75-92 (1984).
Ligoure, Christian, "Adhesion between a Polymer Brush and an Elastomer: A Self-Consistent Mean Field Model", Macromolecules, vol. 29, pp. 5459-5468 (1996).
Ma, H. et al., Reverse Atom Transfer Radical Polymerization of Methyl Methacrylate in Room-Temperature Ionic Liquids, J. Polym. Sci., A Polym. Chem., 41, pp. 143-151 (2003).
Matsen, M.W., "Phase Behavior of Block Copolymer/Homopolymer Blends", Macromolecules, vol. 28, pp. 5765-5773 (1995).
Milner, S.T. et al., "Theory of the Grafted Polymer Brush", Macromolecules, vol. 21, pp. 2610-2619 (1988).
Milner, S.T. et al., "End-Confined Polymers: Corrections to the Newtonian Limit", Macromolecules, vol. 22, pp. 489-490 (1989).
Noolandi, Jaan et al., "Theory of Block Copolymer Micelles in Solution", Macromolecules, vol. 16, pp. 1443-1448 (1983).
Semenov, A.N., "Theory of Diblock-Copolymer Segregation to the Interface and Free Surface of a Homopolymer Layer", Macromolecules, vol. 25, pp. 4967-4977 (1992).
Semenov, A.N., "Phase Equilibria in Block Copolymer-Homopolymer Mixtures", Macromolecules, vol. 26, pp. 2273-2281 (1993).
Shull, Kenneth R., "End-Adsorbed Polymer Brushes in High- and Low-Molecular-Weight Matrices", Macromolecules, vol. 29, pp. 2659-2666 (1996).
Whitmore, Mark Douglas et al., "Theory of Micelle Formation in Block Copolymer-Homopolymer Blends", Macromolecules, vol. 18, pp. 657-665 (1985).
Wijmans, C.M. et al., "Effect of Free Polymer on the Structure of a Polymer Brush and Interaction between Two Polymer Brushes", Macromolecules, vol. 27, pp. 3238-3248 (1994).
Witten, T.A. et al., "Stress Relaxation in the Lamellar Copolymer Mesophase", Macromolecules, vol. 23, pp. 824-829 (1990).
Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).
Haider, Saira Bano, Mar. 3, 2009 Advisory Action from U.S. Appl. No. 11/104,759 (3 pp.).
Lipman, Bernard, Notice of Allowance dated Jan. 14, 2009 from U.S. Appl. No. 11/058,156 (5 pp.).
Harlan, Robert D., Offie Action dated Jan. 9, 2009 from U.S. Appl. No. 11/117,981 (6 pp.).
Cain, Edward J., Notice of Allowance dated Dec. 31, 2008 from U.S. Appl. No. 11/642,124 (5 pp.).

* cited by examiner

CORE-SHELL FLUORESCENT NANOPARTICLES

FIELD

The technology disclosed herein is generally related to fluorescent nanoparticles. More particularly, it relates to a fluorescent nanoparticle comprising a core, an intermediate layer, and a shell. This disclosure also provides a method of making the fluorescent nanoparticles.

BACKGROUND

Fluorescent microparticles may be prepared by several practical methods from a variety of polymerizable monomers, including styrenes, dienes, acrylates and unsaturated chlorides, esters, acetates, amides and alcohols. For example, U.S. Pat. No. 4,326,008 to Rembaum discloses fluorescent microspheres obtained by copolymerizing an acrylic monomer containing a covalent bonding group such as hydroxyl, amine, or carboxyl with a fluorescent co-monomer such as dansyl allyl amine. U.S. Pat. No. 5,194,300 to Cheung and U.S. Pat. No. 4,774,189 to Schwartz disclose fluorescent microspheres that are coated by covalently attaching to their surface one or more fluorescent dyes. U.S. Pat. No. 5,073,498 to Schwartz and U.S. Pat. 4,717,655 to Fulwyler disclose fluorescent dyes added during particle polymerization process. In *Uniform Latex Particles*; Seragen Diagnostics Inc. 1984, p. 40, L. B. Bangs describes a method of internally embedding or diffusing a dye after particles have been already polymerized. U.S. Pat. No. 5,723,218 to Haugland et al. discloses diffusely dyeing microparticles with one or more dipyrromethenboron difluoride dyes.

Fluorescent particles to which biological molecules have been attached have been used for immunoassays, as described, for example, in U.S. Pat. No. 4,808,524 to Snyder et al.; as labels for cell surface antigens, as described, for example, in Jett, Keller, Martin, Nguyen, & Saunders, *Ultrasensitive Molecular-Level Flow Cytometry*, in FLOW CYTOMETRY AND SORTING, p. 381, 2$^{nd}$ ed., Wiley-Liss Inc., N.Y. 1990; and as tracers to study cellular metabolic processes, as described, for example, in Hook & Odeyale, Confocal Scanning Fluorescence Microscopy: *A New Method for Phagocytosis Research*, J. LEUKOCYTE BIOL. 45: 277 (1989).

Particles based on micelle formation are also known, for example, U.S. Pat. Nos. 6,437,050, 6,689,469, 6,956,084, 7,112,369, which are hereby incorporated by reference in their entirety. These patents disclose the method of making styrene-core and butadiene-shell micelle particles. Related publications include "*Dendrimers and Dendrons, Concept, Synthesis, Application*", edited by Newkome G. R, Wiley-VCH, 2001; and "*Synthesis, Functionalization and Surface Treatment of Nanoparticles*", edited by Baraton M-I, ASP (Am. Sci. Pub.), Stevenson Ranch, Calif., 2003.

Over the past several years, polymer nanoparticles have also attracted increased attention not only in the technical fields such as catalysis, combinatorial chemistry, protein supports, magnets, and photonics, but also in the manufacture of rubber products such as tires. For example, nanoparticles can modify rubbers by uniformly dispersing throughout a host rubber composition as discrete particles. The physical properties of rubber such as moldability and tenacity can often be improved through such modifications.

The production and use of fluorescent labels in medicine and biology have grown rapidly and have been very profitable in the market. The availability of a new class of fluorescent markers offering clearly improved performance and safety is a strategic interest for this market. Today, biologists employing fluorescent techniques rely on dye molecules that have serious drawbacks. Particularly, many of these dye molecules are carcinogenic. Therefore there is a need for a safer, better performing material for use in the fluorescent/bio-optical market.

SUMMARY

A new class of fluorescent nanoparticles, and a method for their preparation is described and claimed.

As depicted in the example shown in FIG. 1, the nanoparticles described herein are each made up of a group or a collection of several polymer chains that are organized around a center 1. The polymer chains are linked together by a core formed from dialkenylbenzene(s). The polymer chains extend from the core 2 outwardly to form an intermediate layer 3. The intermediate layer 3 includes the monomer portions of the polymers that are not at the outer terminal end of the polymers (i.e., the intermediate layer includes monomer units that are not in the shell 4). It should be understood that the intermediate layer is not limited to a single monomer unit in each polymer chain, but may include several monomer units. Additionally, the intermediate layer may be separated into sublayers, and the sublayers may include blocks of various homopolymer or copolymer. For example a sublayer may include a block of randomized styrene-butadiene copolymer or a homopolymer such as polyisoprene or polystyrene. A shell layer or shell 4, is comprised of the monomer units or functionally or non-functionally initiated polymer chain heads at the outer terminal ends of each polymer. The shell layer 4 is the outermost portion of the nanoparticle.

The living polymers form micelles due to the aggregation of ionic chain ends and the chemical interactions of the hydrophobic polymer chains in hydrocarbon solvent. When the alkenylbenzene is added, the micelles become crosslinked and the stable nanoparticle is formed.

In one example, a fluorescent nanoparticle comprises (1) a core made from alkenylbenzene; (2) an intermediate layer; (3) a shell layer comprising the outer surface of the nanoparticle; and (4) a fluorescent portion that arises from the addition of a corresponding monomer with a structure represented by the following formula:

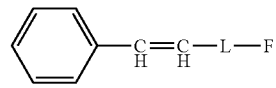

where L is a direct bond or a linker group, and F is any fluorescent moiety. The fluorescent portion is located in at least one of the following locations: the core, the intermediate layer, or the shell layer of the nanoparticle.

An example method of preparing such fluorescent nanoparticles includes: (i) preparing a living polymer with a fluorescent portion by a step selected from the group consisting of: (a) copolymerizing a fluorescent monomer with a monomer or monomers; (b) polymerizing a monomer or monomers with a fluorescent initiator; and (c) polymerizing a monomer to produce a living polymer, and subsequently adding a fluorescent monomer to the living polymer to create a fluorescent block; (ii) adding a crosslinking agent; and (iii) quenching the ionic chain ends with a proton source. After (i) but before (ii), the ionic chain ends of the polymers with fluorescent portions aggregate into micelles. The addition of the crosslinking agent causes the nanoparticle to form by producing a crosslinked core.

In yet another example, a fluorescent nanoparticle includes a core, an intermediate layer, and a shell layer. The intermediate and shell layers include ionic chain ends that extend from the intermediate layer into the core. The shell is the outermost layer of the nanoparticle. The core includes alkenylbenzene monomer units that have crosslinked the ionic chain ends of the intermediate layer. The alkenylbenzene monomers may have the same structure or may be a mixture of two or more different structures. A fluorescent portion is located in at least one of the intermediate or shell layers, or at the core. The fluorescent portion includes at least one fluorescent monomer with a structure represented by the following formula:

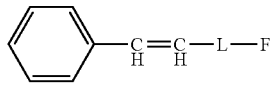

where L is a direct bond or a linker group, and F is a fluorescent moiety. The fluorescent monomer may be located at the core, the intermediate layer, or the shell layer.

The fluorescent nanoparticles can be used in rubber compositions.

DETAILED DESCRIPTION

Figure 1:
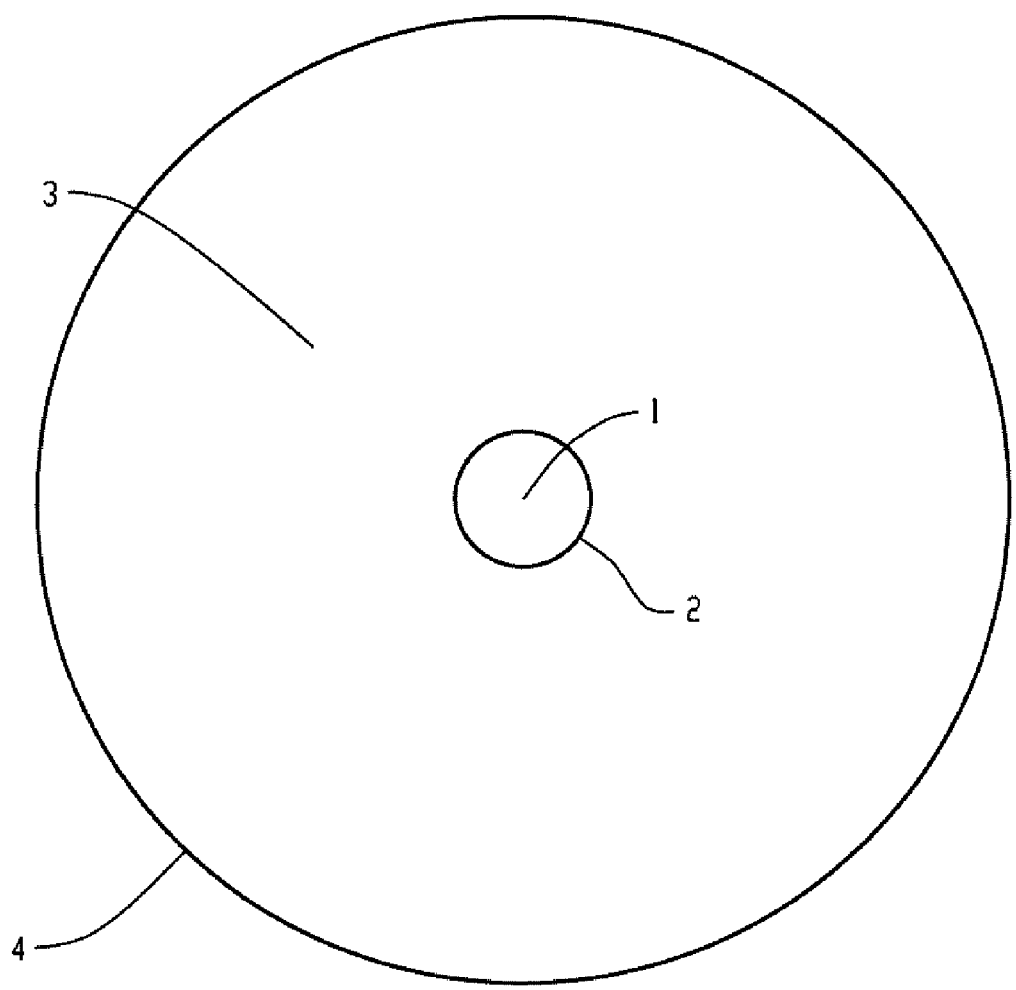
FIG. 1 is an example diagram of a nanoparticle.

An exemplary fluorescent nanoparticle comprises a core including crosslinked alkenylbenzene monomers, an intermediate layer that includes polymer chains, and an outer shell layer that includes the head of the polymer chains. A fluorescent portion is located along the polymer chain in the intermediate layer, the shell, or at the core. It should be understood that the intermediate layer may have various thicknesses, i.e. the polymers may include one or many monomers. Preferably, the nanoparticle is less than 200 nm in diameter (expressed as a mean average diameter), more preferably less than about 100 nm, and most preferably less than about 50 nm. The nanoparticles are preferably spherical, though shape defects are acceptable, provided the nanoparticles generally retain their discrete nature with little or no polymerization between particles.

The fluorescent nanoparticles can be copolymerized in several ways. In one example, one or more monomers are polymerized with an initiator such as butyl lithium. The resulting ionic chain ends self-assemble into micelles around a center to form an aggregate core, while the hydrophobic polymer chains radiate out away from the ionic chain ends. A crosslinking agent, such as DVB, is then added along with a fluorescent monomer (or optionally the fluorescent monomer can be added in a separate step). The ionic chain ends within the aggregate core randomly react with both the DVB and fluorescent monomer to yield a crosslinked core containing fluorescent moieties. A proton source is used to quench the living polymer chains. Suitable proton sources are well known to those of skill in the art and include, but are not limited to, alcohols such as isopropanol.

In another example, one or more monomers are polymerized using a fluorescent initiator. The fluorescent initiator can be formed from a fluorescent monomer and an initiator such as butyl lithium. The resulting polymers have a fluorescent portion at one end. In a hydrocarbon solvent, the ionic chain ends aggregate into a micelle with the fluorescent portion on the outer surface. Then a crosslinking agent, such as DVB, is added to crosslink portions of the ionic chain ends of the micelle, thereby forming and stabilizing the core of the nanoparticle. A proton source is used to quench the living polymer chains.

In another example, one or more monomers and at least one fluorescent monomer are copolymerized using an initiator such as butyl lithium. The resultant living copolymers have a fluorescent portion within the chains. The ionic chain ends then self-assemble into micelles in a hydrocarbon solvent. A crosslinking agent, such as DVB, is added to crosslink portions of the ionic chain ends of the micelle, thereby forming and stabilizing the core of the nanoparticle. A proton source is used to quench the living polymer chains.

In another example, one or more monomers are polymerized using an initiator such as butyl lithium to a desired degree of polymerization. The resulting polymers are then copolymerized with one or more fluorescent monomers. This yields living copolymer chains with fluorescent portions within the chain. The living copolymer chains then self-assemble into micelles in a hydrocarbon solvent. A crosslinking agent, such as DVB, is added to crosslink portions of the ionic chain ends within the micelle, thereby forming and stabilizing the core of the nanoparticle. A proton source is used to quench the living polymer chains.

In variations of the above exemplary nanoparticle assembly methods, additional monomers can be copolymerized with the monomer, yielding various copolymers. Furthermore, the fluorescent monomer can be added at various stages in the copolymerization so as to control where in the polymer chain the fluorescent monomer is located.

Examples of the types of monomers that may be used to prepare the polymer chains of the nanoparticles include: styrene, t-butyl styrene, butadiene, isoprene, copolymers of a combination of these, or derivatives thereof. Mixtures of different polymers and copolymers are also possible in a single nanoparticle.

An exemplary fluorescent nanoparticle synthesis method comprises a multi-stage anionic polymerization. Multi-stage anionic polymerizations have been conducted to prepare block-copolymers, for example in U.S. Pat. No. 4,386,125, which is incorporated herein by reference.

A liquid hydrocarbon medium can function as the solvent, and may be selected from any suitable aliphatic hydrocarbon, alicyclic hydrocarbon, or mixture thereof with a proviso that it exists in liquid state during the preparation of the nanoparticles. Exemplary aliphatic hydrocarbons include, but are not limited to, pentane, isopentane, 2,2 dimethyl-butane, hexane, heptane, octane, nonane, decane, and the like. Exemplary alicyclic hydrocarbons include, but are not limited to, cyclopentane, methyl cyclopentane, cyclohexane, methyl cyclopentane, cycloheptane, cyclooctane, cyclononane, cyclodecane, and the like. Generally, aromatic hydrocarbons and polar solvents are not preferred as the liquid medium. In exemplified embodiments, the liquid hydrocarbon medium comprises hexane or cyclohexane.

In one example, the fluorescent nanoparticles are formed from polymers having a poly(alkyl-substituted styrene) block and a polymer block of fluorescent monomers having a structure represented by the formula shown below:

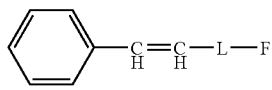

in which L is a direct bond or a linker group, and F is any fluorescent moiety.

For example, the fluorescent moiety F may be selected from the group consisting of perylene, phenanthrene, anthracene, naphthalene, pyrene, chrysene, naphthacene, and combinations thereof.

In one example, the —F group has a structure represented by the formula as shown below (pyrene):

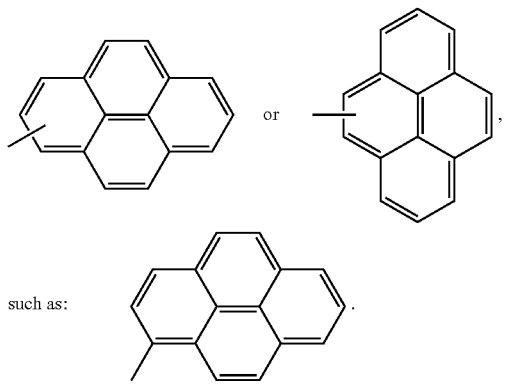

The -L- group may be just a direct bond or any suitable divalent group, for example, methylene, ethylene, and propylene group. Preferably, the -L- group has a structure represented by the formula as shown below:

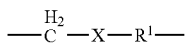

in which X comprises a heteroatom such as O, S, P($R^2$), Si($R^2$)$_2$, Si(O$R^2$)$_2$ (where $R^2$ is as defined below), and N (where N can be substituted such that the -L- group contains a tertiary amino group); and $R^1$ is a straight or branched $C_1$-$C_8$ alkylene group.

In an example, the -L- group has a structure represented by the formula as shown below:

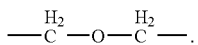

The fluorescent monomer may have, for example, a structure represented by the formula as shown below:

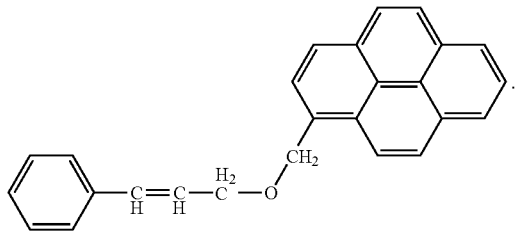

The fluorescent block may also optionally further comprise other monomers.

An example alkyl-substituted styrene block monomer of the example polymer may have a structure represented by the formula shown below:

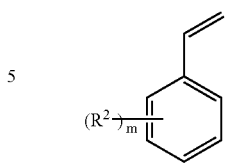

in which m is an integer and $1 \leq m \leq 5$, preferably m is 1 or 2; and $R^2$ may be selected from saturated or unsaturated, substituted or unsubstituted, straight or branched, cyclic or acyclic $C_3$-$C_8$ alkyl groups.

Another exemplary alkyl-substituted styrene monomer comprises tert-butyl styrene (TbST) such as t-butyl styrene as shown below:

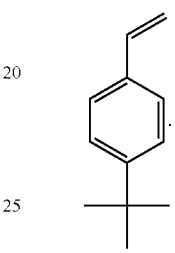

It is believed that the alkyl group in the alkyl-substituted styrene monomer lowers the overall solubility of the resulting living polymer in a selected liquid hydrocarbon medium thereby facilitating micelle self-assembly and nanoparticle formation.

In one example, the alkyl-substituted styrene monomer may be copolymerized with any suitable fluorescent comonomers; and as a result, the later formed nanoparticles will have a fluorescent intermediate later. Fluorescent comonomers for this purpose include, but are not limited to cinnamyl-O—CH$_2$-pyrene. An exemplary polymerization of alkyl-substituted styrene monomers into a poly(alkyl-substituted styrene) block is initiated via addition of anionic initiators that are known in the art. For example, the anionic initiator can be selected from any known organolithium compounds. Suitable organolithium compounds are represented by the formula as shown below:

R(Li)$_x$ wherein R is a hydrocarbyl group having 1 to x valence(s). R generally contains 1 to 20, preferably 2-8, carbon atoms per R group, and x is an integer of 1-4. Typically, x is 1, and the R group includes aliphatic groups and cycloaliphatic groups, such as alkyl, cycloalkyl, cycloalkylalkyl, alkylcycloalkyl, alkenyl, as well as aryl and alkylaryl groups.

Specific examples of R groups include, but are not limited to, alkyls such as methyl, ethyl, n-propyl, isopropyl, n-butyl, isobutyl, t-butyl, n-amyl, isoamyl, n-hexyl, n-octyl, n-decyl, and the like; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like; cycloalkylalkyls such as cyclopentyl-methyl, cyclohexyl-ethyl, cyclopentyl-ethyl, methyl-cyclopentylethyl, 4-cyclohexylbutyl, and the like.

In selected examples, n-butyllithium, sec-butyllithium, tert-butyllithium, or a mixture thereof are used to initiate the polymerization of alkyl-substituted styrene monomers into a poly(alkyl-substituted styrene) block.

In one example, a fluorescent initiator may be used to initiate the polymerization of alkyl-substituted styrene monomers; and as a result, the later formed nanoparticles will have a fluorescent surface.

Examples of suitable fluorescent initiator include, but are not limited to, the following lithium compound:

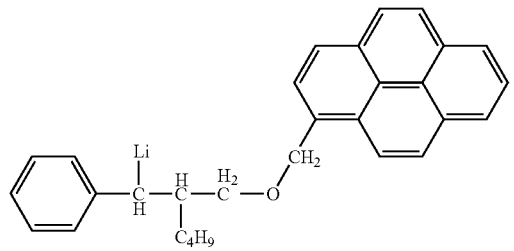

Other examples of suitable fluorescent initiators may be obtained as taught in U.S. Published Application No. 2006/0036050, the entirety of which is incorporated herein by reference.

The polymerization of alkyl-substituted styrene monomers into a poly(alkyl-substituted styrene) block may last until a predetermined degree of polymerization is obtained. The degree of polymerization may be selected for particular applications. For example, a predetermined degree of polymerization of the poly(alkyl-substituted styrene) block may be broadly within the range of from about 1 to about 50, preferably within the range of from about 1 to about 25, more preferably within the range of from about 1 to about 10, and most preferably within the range of from about 1 to about 5.

The living polymer block that contains one or more fluorescent monomers may be copolymerized or crosslinked with a multiple vinyl-substituted aromatic hydrocarbon to form the desired fluorescent nanoparticles. The fluorescent nanoparticles preferably retain their discrete nature with little or no polymerization between each other. In an example embodiment, the fluorescent nanoparticles are substantially monodisperse and uniform in shape.

In another example, a mixture of multiple vinyl-substituted aromatic hydrocarbon and fluorescent monomer may be used to copolymerize with the poly(alkyl-substituted styrene) block, thus producing a crosslinked fluorescent core.

An exemplary multiple vinyl-substituted aromatic hydrocarbon has a formula as shown below:

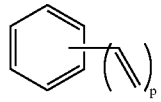

in which p is an integer and $2 \leq p \leq 6$, preferably, p is 2 or 3, more preferably p is 2, i.e. divinylbenzene (DVB).

In certain examples, the divinylbenzene may be selected from any one of the following isomers or any combination thereof:

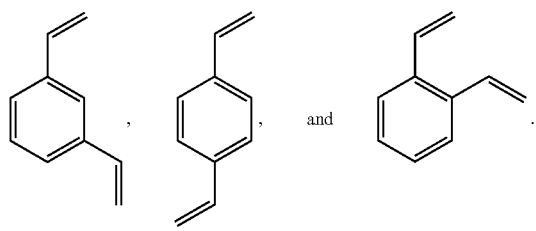

Consequently, the fluorescent nanoparticles are formed from the micelles with a core including crosslinked alkyl-substituted styrene blocks and an intermediate layer including fluorescent blocks.

The polymerization reactions used to prepare the fluorescent nanoparticles may be terminated with a terminating agent. Suitable terminating agents are known to those skilled in the art and include, but are not limited to, alcohols such as methanol, ethanol, propanol, and isopropanol.

In embodiments, the molecular weight (grams/mole) of the fluorescent nanoparticles may be broadly within the range of from about 50,000 to about 100 million, preferably within the range of from about 100,000 to about 10 million.

Various rubber articles may be manufactured from the composition as described supra. References for this purpose may be made to, for example, U.S. Pat. No. 6,875,818, which is herein incorporated by reference.

In one example application, a composition including the fluorescent nanoparticles discussed herein may be sprayed or coated on a tire sidewall. The fluorescent property of the nanoparticles may function to improve traffic safety at night by increasing the visibility of the tires and the vehicle. Biological applications are also envisioned.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Example 1

Preparation of Cinnamyl-O—$CH_2$-pyrene Fluorescent Monomer

To a solution of 1-pyrene methanol (5 g, 21.5 mmol) in THF (150 mL) was added NaH (2 g, 50 mmol). After stirring for 30 min., cinnamyl chloride (4.3 g, 28.7 mmol) was added drop wise. After 2.5 h of reflux, the reaction was quenched with water and the two layers separated. The organic solution was washed with water (2×100 mL) followed by washing with brine (2×100 mL), dried over $MgSO_4$ and concentrated to an orange oil. The product was purified by column chromatography (1:1, $CH_2Cl_2$:hexanes) to yield 5 g (67% yield). The structure was confirmed by $^1H$ NMR analysis.

Example 2

Preparation of Fluorescent Nano Micelle Particles (FNMPs) with t-Butylstyrene

To a 10 oz. nitrogen purged bottle, cyclohexane (20 mL), t-butylstyrene (1.2 mL), oligomeric oxolanyl propane (OOPs) (0.03 mL, 1.6M) and butyl lithium (0.1 mL, 1.54M) were added. The bottle was placed into 80° C. water bath for 10 minutes. After cooling to 23° C., a charge of cinnamyl-O—$CH_2$-pyrene (10 mL, 0.14M in cyclohexane) was added into the bottle. After continual cooling for 5 minutes, a charge of DVB (0.5 mL) was added to the mixture. The reaction proceeded for 1 hour, and then was then terminated by adding isopropanol (0.1 mL).

Example 3

Preparation of FNMPs with t-Butylstyrene

To a 10 oz. nitrogen purged bottle, hexane (20 mL), t-butylstyrene (1.2 mL), and butyl lithium (0.1 mL, 1.54M) were added. Then, the bottle was placed into an 80° C. water bath for 30 minutes. The bottle was then cooled and maintained at a temperature of 23° C. A mixture of cinnamyl-O—$CH_2$-pyrene (10 mL, 0.14M in cyclohexane), DVB (0.5 mL) and t-butylstyrene (1 mL) was added to the bottle. The reaction proceeded at 23° C. for 2 hours, and was then terminated by adding isopropanol (0.1 mL).

Example 4

Preparation of FNMPs with t-Butylstyrene

To a 10 oz. nitrogen purged bottle, hexane (20 mL), t-butylstyrene (1.2 mL), and butyl lithium (0.1 mL, 1.54M) were added. Then, the bottle was placed into 80° C. water bath for 30 minutes and then cooled to 25° C. A mixture of cinnamyl-O—$CH_2$-pyrene (10 mL, 0.14M in cyclohexane), DVB (0.5 mL), and t-butylstyrene (1 mL) was added to the bottle. After the reaction proceeded at 23° C. for 1 hour, t-butylstyrene (1 mL) was added to the bottle. After an additional 60 minutes, the reaction was terminated by adding isopropanol (0.5 mL).

Example 5

(Prospective): Preparation of FNMPs with Butadiene

To a 10 oz. nitrogen purged bottle, hexane (20 mL), butadiene (5 gr, 20% in hexane), oligomeric oxolanyl propane (OOPs) (0.03 mL, 1.6M solution) and butyl lithium (0.1 mL, 1.54M) would be added. The bottle would then be placed into 80° C. water bath for 10 minutes. After cooling to 23° C., a charge of cinnamyl-1-methylpyrene ether (10 mL, 0.14M in cyclohexane) would be added into the bottle. After continual cooling for 5 minutes, a charge of DVB (0.5 mL) would be added to the mixture. The reaction would proceed for 1 hour, and then would be terminated by adding isopropanol (0.1 mL).

Example 6

(Prospective): Preparation of FNMPs with Styrene Butadiene

To a 10 oz. nitrogen purged bottle, hexane (20 mL), styrene (1 gr, 30% in hexane), butadiene (5 gr, 20% in hexane), oligomeric oxolanyl propane (OOPs) (0.03 mL, 1.6M solution) and butyl lithium (0.1 mL, 1.54M) would be added. The bottle would be placed into 80° C. water bath for 10 minutes. After cooling to 23° C., a charge of cinnamyl-1-methylpyrene ether (10 mL, 0.14M in cyclohexane) would be added into the bottle. After continual cooling for 5 minutes, a charge of DVB (0.5 mL) would be added to the mixture. The reaction would proceed for 1 hour, and then would be terminated by adding isopropanol 0.1 mL).

Example 7

Characterization of Fluorescent Nano Micelle Particles (FNMPs)

A 1 mL portion of the Example 3 solution was diluted to about a $1 \times 10^{-4}$ wt % solution in toluene. A drop of the diluted solution was then coated on a graphed copper micro-screen. After the solvent evaporated, the screen was exposed to $RuO_4$ for about 5 minutes, and then examined by TEM. The image (see FIG. 2) shows that the FNMPs have a mean size of about 40 nm.

Example 8

Characterization of Fluorescent Nano Micelle Particles (FNMPs)

Figure 2:
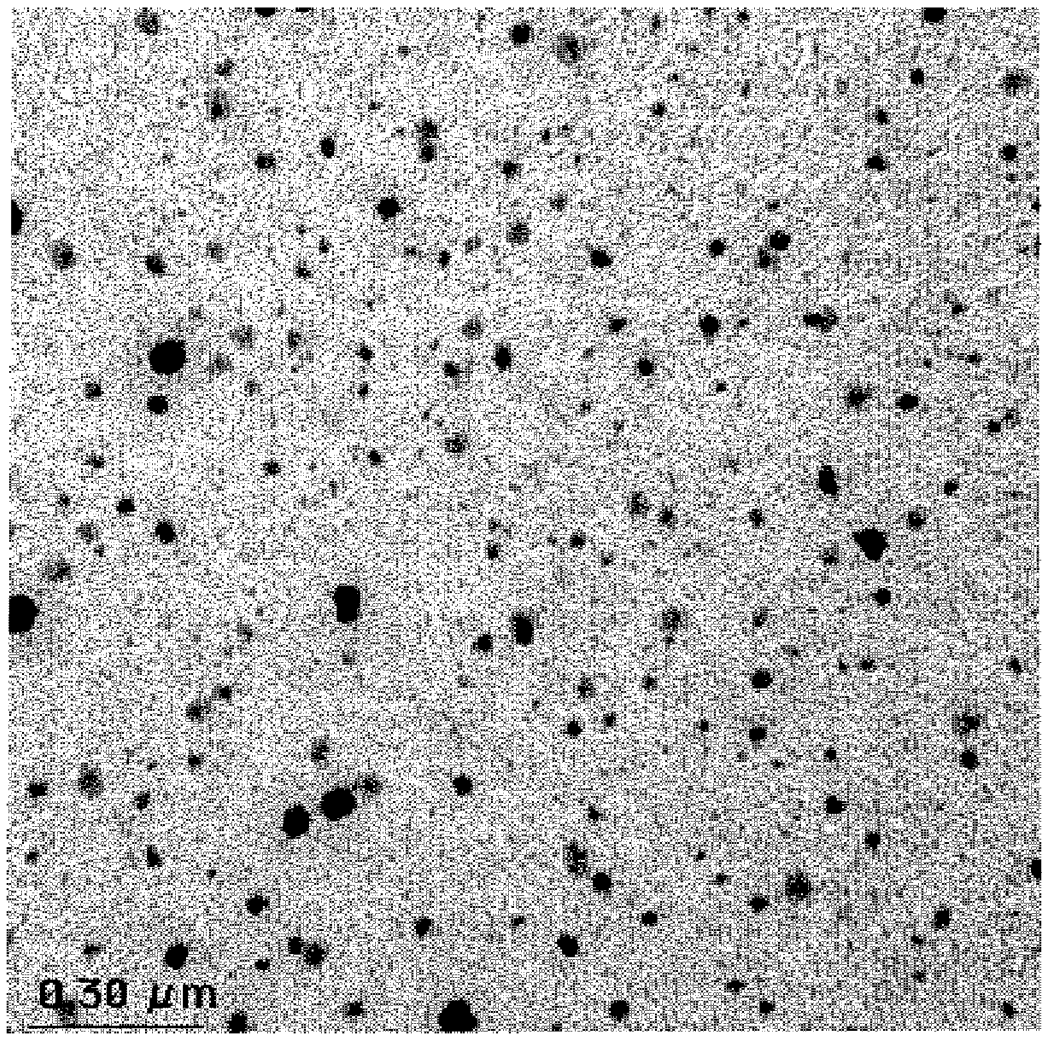
FIG. 2 is a transmission electron microscopy (TEM) photograph of fluorescent nanoparticles.
Figure 3:
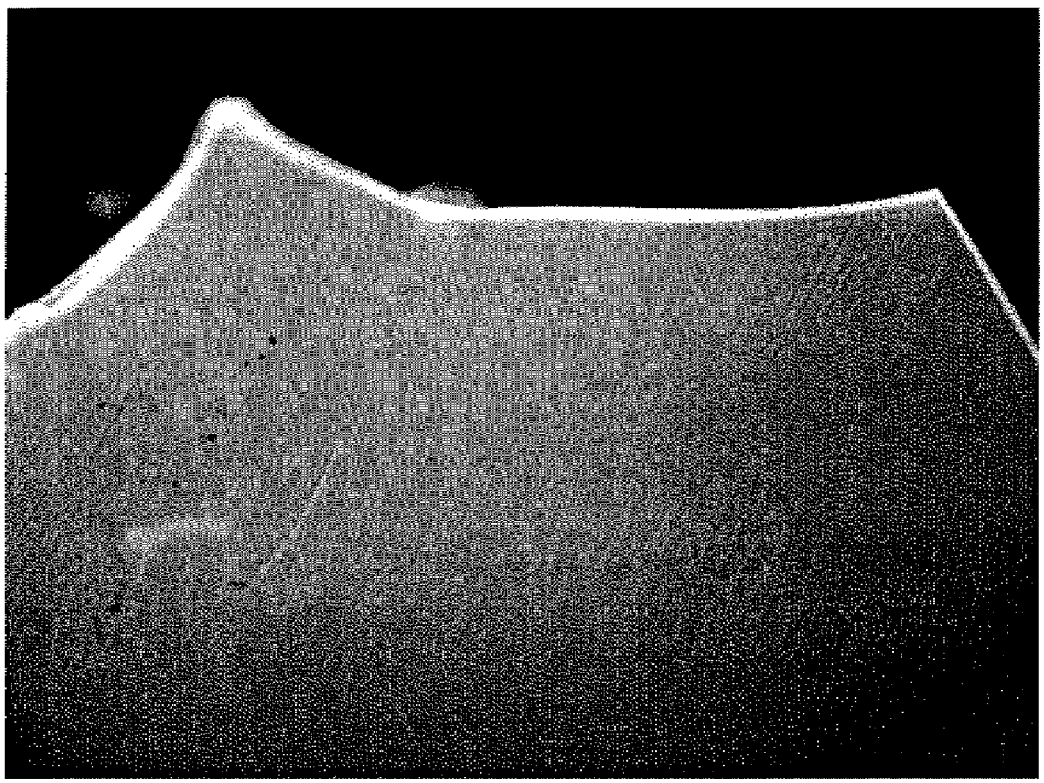
FIG. 3 is the microscopy picture of a film containing the fluorescent nanoparticles.

A 5 mL aliquot was taken from the Example 3 reaction and added to an aluminum pan. After the solvent evaporated, a film of about 0.1 mm thickness resulted. The characterization was performed using an Olympus-BH2 microscope equipped with a Polaroid camera. The polymer film was examined under a UV light. The film showed fluorescence under green light (~450 to 510 nm). As shown in FIG. 2, the film was entirely glowing as compared to the background. The experiment indicated that the desired nano-sized materials with fluorescent properties were produced.

While the invention has been illustrated and described by way of examples, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A fluorescent nanoparticle comprising:
    (a) a core comprising at least one alkenylbenzene monomer;
    (b) an intermediate layer comprising polymer chains;
    (c) a shell layer comprising an outer surface of the nanoparticle; and
    (d) at least one fluorescent portion bonded to the nanoparticle;
    the fluorescent portion arising from the addition of a corresponding monomer with a structure represented by the following formula:

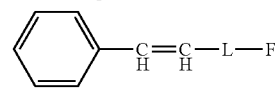

wherein L is a direct bond or a linker group, and F is any fluorescent moiety;
    wherein the fluorescent portion is a monomer-contributed unit located in at least one of the following locations: the core, the intermediate layer, or the shell layer of the nanoparticle.

2. The fluorescent nanoparticle of claim 1, wherein the polymer chains are selected from the group consisting of: polystyrene, polybutadiene, polyisoprene, copolymers of a combination of styrene, butadiene, or isoprene, derivatives thereof, or mixtures thereof.

3. The fluorescent nanoparticle according to claim 1, in which the fluorescent moiety F is selected from the group consisting of pyrene, perylene, phenanthrene, anthracene, naphthalene, and combinations thereof.

4. The fluorescent nanoparticle according to claim 1, in which the fluorescent moiety F has formula of:

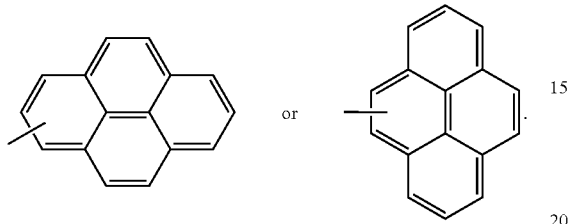

5. The fluorescent nanoparticle of claim 1, in which the fluorescent moiety F has a formula of:

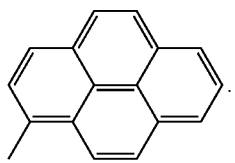

6. The fluorescent nanoparticle of claim 1, in which the linker group L is:

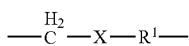

wherein X comprises a heteroatom; and $R^1$ is a straight or branched $C_1$-$C_8$ alkylene group.

7. The fluorescent nanoparticle of claim 1, in which the linker group L is:

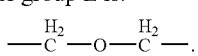

8. The fluorescent nanoparticle of claim 1, in which the at least one fluorescent portion contains one or more monomers-contributed units with a formula of:

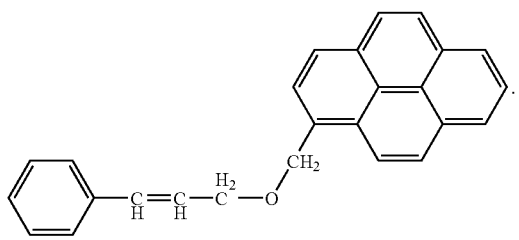

9. The fluorescent nanoparticle of claim 1, in which the at least one alkenylbenzene monomer has a formula of:

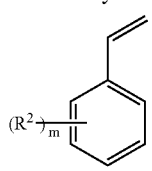

wherein m is an integer and $1 \leq m \leq 5$; and $R^2$ is selected from saturated or unsaturated, substituted or unsubstituted, straight or branched, cyclic or acyclic $C_3$-$C_8$ alkyl groups.

10. The fluorescent nanoparticle of claim 1, in which the at least one alkenylbenzene monomer has a formula of:

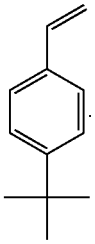

11. The fluorescent nanoparticle of claim 1, wherein the shell includes one or more fluorescent portions and the one or more fluorescent portions comprises residues of a fluorescent initiator.

12. The fluorescent nanoparticle of claim 11, in which the fluorescent initiator has a formula of:

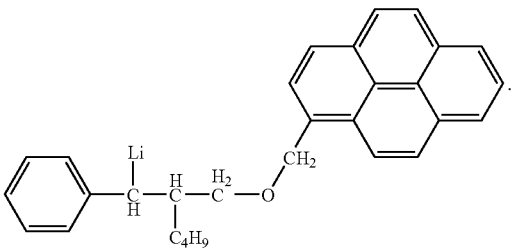

13. The fluorescent nanoparticle of claim 1, wherein the core is crosslinked using a multiple vinyl-substituted aromatic hydrocarbon having a formula of:

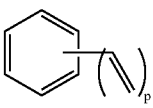

wherein p is an integer and $2 \leq p \leq 6$.

14. The fluorescent nanoparticle of claim 13, in which the multiple vinyl-substituted aromatic hydrocarbon is selected from one of the following isomers or any combination thereof:

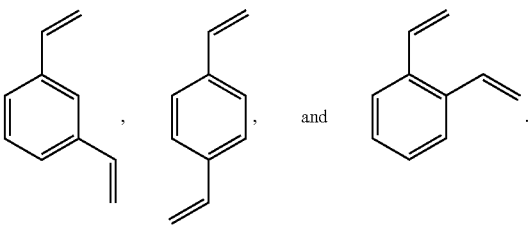

15. The fluorescent nanoparticle of claim 1, which has a weight average molecular weight of from about 50,000 to about 100 million.

16. The fluorescent nanoparticle of claim 1, which has a generally spherical shape with a mean average diameter of less than about 100 nm.

17. The fluorescent nanoparticle of claim 1, wherein the fluorescent portion is located along a polymer chain in the intermediate layer.

18. The fluorescent nanoparticle of claim 1, wherein the fluorescent portion is located in the core.

19. The fluorescent nanoparticle of claim 1, wherein the nanoparticle has a diameter of less than about 200 nm.

20. A fluorescent nanoparticle comprising:

a core, an intermediate layer, and a shell layer;

the intermediate and shell layers include polymer chains extending from the intermediate layer into the shell layer, the shell being the outermost layer of the nanoparticle;

the core including alkenylbenzene monomers, the alkenylbenzene monomers having the same structure or being a mixture of two or more different structures; the alkenylbenzene monomers crosslinking living polymer chain ends of the polymer chains of the intermediate layer;

a fluorescent portion bonded to at least one of the intermediate or shell layers, or the core;

the fluorescent portion including at least one fluorescent monomer-contributed unit with a structure represented by the following formula:

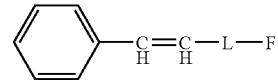

wherein L is a direct bond or a linker group, and F is a fluorescent moiety.

21. The fluorescent nanoparticle of claim 20, wherein blocks of the polymer chains in the intermediate and shell layers are more soluble in a hydrocarbon solvent than blocks of the polymer chains in the intermediate layer that are nearer the core.

22. The fluorescent nanoparticle of claim 20, wherein the intermediate layer comprises a poly(conjugated diene).

23. The fluorescent nanoparticle of claim 20, in which the fluorescent portion comprises residues of a fluorescent initiator.

24. The fluorescent nanoparticle of claim 20, wherein the nanoparticle has a diameter of less than about 200 nm.

* * * * *